United States Patent
Johnson

(10) Patent No.: US 10,895,250 B1
(45) Date of Patent: Jan. 19, 2021

(54) SOLAR POWERED EMERGENCY WATER PUMP SYSTEM

(71) Applicant: Daniel Johnson, Aiken, SC (US)

(72) Inventor: Daniel Johnson, Aiken, SC (US)

(*) Notice: Subject to any disclaimer, the term of this patent is extended or adjusted under 35 U.S.C. 154(b) by 0 days.

(21) Appl. No.: 16/867,976

(22) Filed: May 6, 2020

(51) Int. Cl.
| F04B 17/00 | (2006.01) |
| F04B 17/03 | (2006.01) |
| E21B 43/12 | (2006.01) |
| F04B 47/04 | (2006.01) |
| F04B 47/02 | (2006.01) |
| F04B 49/06 | (2006.01) |
| H02J 7/35 | (2006.01) |

(52) U.S. Cl.
CPC .......... *F04B 17/006* (2013.01); *E21B 43/121* (2013.01); *E21B 43/126* (2013.01); *F04B 17/03* (2013.01); *F04B 47/02* (2013.01); *F04B 47/04* (2013.01); *F04B 49/065* (2013.01); *H02J 7/35* (2013.01)

(58) Field of Classification Search
CPC ........ F04B 17/006; F04B 47/02; F04B 47/04; F04B 49/065; F04B 9/105; F04B 23/00; F04B 49/06; F04B 2201/0201; F04B 2201/121; E21B 43/127; E21B 43/126; E21B 43/121; E21B 34/16; E21B 43/12; Y02E 10/46
See application file for complete search history.

(56) References Cited

U.S. PATENT DOCUMENTS

| 4,720,978 A * | 1/1988 | Spacer | E21B 43/121 60/641.8 |
| 4,765,144 A * | 8/1988 | Spacer | E21B 43/121 60/692 |
| 4,802,829 A * | 2/1989 | Miller | F04B 17/006 417/118 |
| 4,884,953 A * | 12/1989 | Golben | F03G 6/00 417/379 |
| 6,050,779 A * | 4/2000 | Nagao | F04B 17/006 417/28 |
| 6,315,523 B1 * | 11/2001 | Mills | F04B 47/02 307/150 |
| 8,708,671 B2 * | 4/2014 | Gregory | F04B 47/022 417/411 |
| 8,920,140 B2 * | 12/2014 | Snyder | B01D 61/10 417/411 |
| 9,863,415 B2 * | 1/2018 | St. Denis | F04B 9/105 |
| 2007/0047152 A1 * | 3/2007 | Furukawa | B82Y 25/00 360/319 |
| 2010/0268394 A1 * | 10/2010 | Anderson | F03D 9/11 700/288 |

* cited by examiner

*Primary Examiner* — Peter J Bertheaud
(74) *Attorney, Agent, or Firm* — Melissa B. Neely

(57) ABSTRACT

The present invention is a solar powered emergency water pump system designed to be used in combination with a private water well system to provide water when a power outage or other failure disables the primary pump system. The invention is comprised of the following major components: a solar panel for gathering energy, a battery for storing energy for energy supply at night, a controller for converting and directing energy flow, a microprocessor for system control and diagnostics, a hydraulic pump, a submersible hydraulic motor and lifting pump, tubing or piping for water transfer and a container for storing the emergency water. The system is designed for the pump to run 24 hours a day supplying water at a low rate.

4 Claims, 2 Drawing Sheets

SOLAR POWERED EMERGENCY WATER PUMP SYSTEM

CROSS REFERENCE TO RELATED APPLICATIONS

Not Applicable

STATEMENT REGARDING FEDERALLY SPONSORED RESEARCH OR DEVELOPMENT

This invention was not made by an agency of the United States Government nor under a contract with an agency of the United States Government.

THE NAME OF THE PARTIES TO JOINT RESEARCH AGREEMENT

Not Applicable.

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable

BACKGROUND OF THE INVENTION

Field of the Invention

All life needs water to exist. Drinking water is provided to most households via municipal water supplies, although millions of people across the world depend upon private water wells for their drinking water. Thirteen million households depend on private water wells for drinking water in the United States alone. (Source: U.S. Census American Housing Survey 2017). In the aftermath of natural disasters or other unplanned events, power outages can be both widespread and prolonged. For those that depend upon private water wells for drinking water for themselves and their animals, obtaining adequate amounts of drinking water can be a major problem following a disaster.

According to the National Academies of Sciences, Engineering and Medicines an adequate daily fluid intake for a man is approximately 1 gallon of water per day. A woman's daily need is slightly less. (Source Mayo Clinic at www-.mayoclinic.org/healthy-lifestyle/nutrition-and-healthy-eating/in-depth/water/art-200440256 accessed Nov. 21, 2019).

Dogs generally need 0.5 to 1 ounce of water per pound of body weight each day. (Source: Dr. Karen Becker at www.healthpets.mercola.com/sites/healthypets/archive/2014/05/07/dog-water-consumption.aspx accessed Nov. 21, 21019.) Thus, a typical 50 pound dog would need approximately 0.4 gallons of water for day.

Livestock water needs are dependent upon the type and sometimes age and weight of the animal and the environmental conditions. Some typical needs are:

| Animal | Gallons of water per day |
|---|---|
| Dairy Cow | 30 |
| Pig | 1.3 |
| Horse | 8.7 |
| Chickens | 1.3 (for 20 chickens) |

(Source: Ontario Ministry of Agriculture, Food and Rural Affairs at www.omafra.gov.on.ca/english.engineer/facts/07-023.htm#1 accessed Nov. 21, 2019)

The present invention is a Solar Powered Emergency Water Pump System that would typically provide 90 gallons of water per day. The invention could provide adequate drinking water for a family of 4 plus pets and some livestock on a daily basis until utility power is restored.

Description of Related Art

The emerging environmental crisis of global warming due to carbon emissions from fossil fuels is growing the use of alternative means to provide power. A common method is solar energy. Solar energy is being used to heat houses, generate electricity and in several recent United States patents provide power to oil and water pumps including U.S. Pat. No. 10,190,580 (Solar Drive Control System for Oil Pump Jacks) and U.S. Pat. No. 10,273,951 (Solar pump system and method for controlling solar pump system). Although the present invention also uses solar power to provide energy for the water pump portion of the invention, the present invention goes beyond just utilization of solar power to provide a system for emergency water supply in the event of a power outage or other failure of the primary electrical grid powered water pump.

BRIEF SUMMARY OF THE INVENTION

The present invention is a solar powered emergency water pump system designed for a private water well system to reliably provide water when a power outage or other failure disables the primary water pump. The invention is comprised of the following major components: a solar panel for gathering energy, a battery for storing energy for energy supply at night, a controller for converting and directing energy flow, a microprocessor controller and diagnostic module, a hydraulic pump, a submersible hydraulic motor and lifting pump, tubing or piping for water transfer, and a container for storing the emergency water. The system is designed for the pump to run 24 hours a day supplying water at a low rate.

Although the solar powered emergency water pump would most typically be installed to enhance and backup an existing private well water supply system, it could be installed as the primary water pump system to provide water from a previously unused well in the aftermath of a catastrophic event or in non-emergency situations where daily water usage is low.

DETAILED DESCRIPTION OF THE INVENTION

Figure 1:
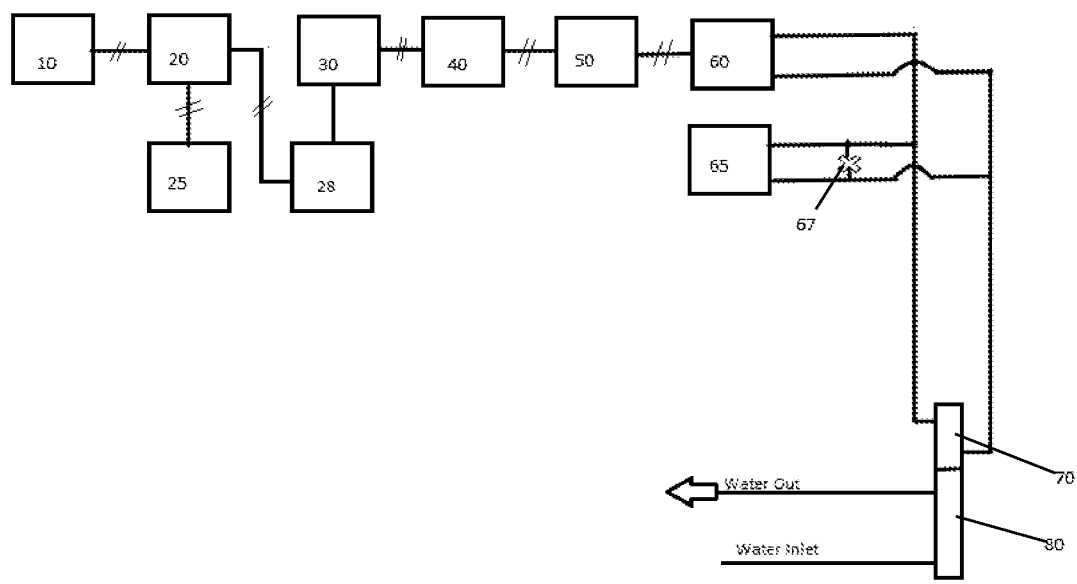
FIG. 1 is a block diagram of the basic components of the system which include the solar panel (10), solar power control and battery charger (20), battery (25), speed control (28), gear motor (30), cam (40), stroke adjustor (50), hydraulic pump (60), makeup hydraulic water supply (65), re-center valve (67), hydraulic motor (70), and reciprocating motion pump (80).

The present invention is a solar powered emergency water pump system designed to enhance a private water well system to provide water when a power outage or other failure disables the main pump system. The system is designed for the pump to run 24 hours a day supplying water at a low rate. The typical embodiment of the invention would provide 90 gallons of water per day at a rate of 3.75 gallons per hour. However, the invention is not limited to this particular rate as both higher and lower rates of flow are possible with the system. It is envisioned that the system could provide between 10-140 gallons of water per day.

In the instances where the primary water system includes a storage tank, the water from the solar powered emergency water system can be routed to the main system storage tank. Typically, the main system storage tank is a pressure tank and forcing the water produced by the emergency water pump system can decrease the daily amount of water produced by the emergency water system but routing water from the emergency pump system to the main system storage tank allows the water produced from the emergency system to be utilized from the existing household water piping. If the main system does not include water storage, then a small storage tank is included with the solar powered emergency water system.

The invention consists of an energy generation system which includes a solar panel (10), solar energy controller and battery charger (20), battery (25), solar power voltage sensor (11), solar panel outlet current sensor (12), battery current sensor (27) and battery voltage sensor (26).

In addition to the energy generation system, the other above ground components of the emergency water pump system include a speed controller (28) for the gear motor (30), cam (40), cam optical interrupter (41), stroke adjustor (50), hydraulic pump (60), makeup hydraulic water supply tank (65), the re-center Valve (67) and the system's control module (100). Components in the well include the hydraulic motor (70) and reciprocating motion pump (80). Piping in the form of tubing or small bore pipe (either metallic or plastic) transfers water from the well into the reciprocating motion pump (80) and from this pump (80) to water storage. Water is also transferred between the hydraulic pump (60) and the hydraulic motor (70) to act as hydraulic fluid using two tubes (61, 62) that alternate flow direction to actuate the hydraulic motor (70).

Other sensors utilized in the system in addition to the ones noted in above include gear motor voltage sensor (21), gear motor current sensor (22), cam optical interrupter (41), hydraulic pump pressure insert stroke sensor (62), hydraulic pump pressure retract stroke sensor (61), and a water outlet pressure sensor (81).

The preferred embodiment of the invention utilizes a solar panel (10) as the energy source to operate the emergency pump system. As the system is intended to pump water 24 hours a day, a battery (25) is also needed to store excess power from the solar panel which can be used at night or during low sunlight periods. A solar power control and battery charger (20) is utilized send sufficient power to the pump system to pump the desired amount of water and send excess energy from the solar panel (10) to the battery (25). There are many sizes of solar panels (10) available commercially. Some commercially available solar panels (10) are sold as part of a kit which includes the solar power control and battery charger (20), the battery (25) and the sensors (11, 12, 26, 27).

Although the preferred embodiment of the invention utilizes solar power to operate the emergency pump system, the invention is not limited to the use of solar power. Other alternative energy sources could be utilized to provide power for the pumping system such as wind power. The selection of the power source used would be dependent on the locale where the emergency pump system will be utilized so that the power source is what is best suited for that locale.

The gear motor (30) is a brushless electric motor also known as a BL motor, electronically commutated motor (ECM or EC motor) and synchronous DC motors. A brushless motor is used in the system to extend running time between periods of maintenance. In the preferred embodiment of the invention, the output shaft of the gear motor turns relatively slowly at approximately 6 revolutions per minute. The slow movement reduces wear and extends the average run time of the emergency pump system. A speed controller (28) receives input from the system control module (100) to adjust the operating speed of the gear motor (30).

The rotary motion from the gear motor (30) is converted to linear or reciprocating motion by the cam (40). The cam (40) both pushes and pulls the output rod. A small ball bearing rides in a groove in a high density polyethylene (HDPE) disk (31) driven by the gear motor (30). The track shape was designed to keep insert and extend flows basically the same and keeping the motor current consistent. Although HDPE is the preferred material for the disk (31) other materials could be used instead of the HDPE.

The stroke adjustor (50) is a lever arm with a movable fulcrum. It is used to increase or decrease the reciprocating motion. This allows one model of pump to serve a wider range of applications. For example, if the lifting pressure needed is double because the well is 200 feet instead of 100 feet, the stroke is reduced by setting the fulcrum nearer to the hydraulic pump (60) shaft. The same motor torque and power now produces the higher pressure needed to pump the water, however, the rate at which the water is pumped is also reduced so less water is produced per day.

A hydraulic pump (60) is used in the system to convert the mechanical power into hydraulic power. Well water is used as the hydraulic fluid. The hydraulic fluid is conveyed from the hydraulic pump (60) to and from the hydraulic motor (70) via tubing or small bore piping. A small tank is utilized to provide makeup hydraulic water supply (65). As the hydraulic fluid is well water, this tank can be filled using the main well water system supply. Because the system produces a low flow rate, small bore tubing (approximately ¼ inch) can be used for both the hydraulic tubing as well as the water production or outlet tubing (202), without excessive energy loss.

As the hydraulic fluid is well water, leaks of hydraulic fluid are not problematic in presenting a contamination risk as could occur with a typical hydraulic fluid such as hydrocarbon or silicone oils.

Inside the well are the hydraulic motor (70) and the reciprocating motion pump (80). The reciprocating motion pump (80) is identical to the hydraulic motor (70). The rod of the reciprocating motion pump (80) is directly connected to the hydraulic motor (70). The hydraulic motor (70) drives the movement of the reciprocating motion pump (80) rod to pump water out of the well.

If the hydraulic system (60, 70) develops piston seal leakage that is not equal for both insert and withdraw strokes, the down-well shaft connecting the hydraulic motor (70) to the reciprocating motion pump (80) will migrate. Bumping the end stop does not damage the system but causes an unusual pressure spike in one of the hydraulic lines which would be detected by one of the pressure sensors on the hydraulic lines (61, 62). If this occurs the control module (100) opens the re-center valve (67) at the proper cam angle and for the appropriate duration to ameliorate the imbalance.

Water from the emergency water pump system is transferred from the system to the water storage tank for the existing primary pump system. If the primary pump system does not include a water storage tank (i.e. the primary pump system operates as an on demand system), an emergency water storage tank (90) is included with the system. A number of different types of inexpensive storage vessels could be utilized with the system including a pillow tank, a pressurized storage tank, or an intermediate bulk container (also known as IBC totes, tote tanks or tote bins).

Although any mechanical system has periods of downtime due to breakdown of the various parts, it is envisioned that the preferred embodiment of this invention will be able to pump water on a near continuous basis. The emergency water pump system was designed to avoid the typical failure modes of a nominal primary pump system.

In the typical private well water supply system, the pump ("primary pump") is powered from the electrical grid. In the event of a power grid outage, the primary pump system is disabled. However, the present invention is powered by alternative power sources such as solar, in the preferred embodiment, or wind and is not affected by the grid power outage and can continue to provide water during a grid power outage.

The present invention is less subject to damage and downtime due to lightning strikes than is the primary pump system. Lightning not infrequently stops the primary pump because of surges entering from the grid and down into the well which serves as an excellent ground. As the power supply for the present invention is not connected to the electrical grid and has no conductors going down the well, secondary lightning currents are not attracted to the small area of the emergency pump.

Primary pumps run at high speed and are subject to damage from vibration, cavitation, and abrasive particle wear. The pump in the present invention runs slowly and has no rotating or fast moving parts down the well so it does not vibrate or cavitate. Because the water flow in the present invention is low, fewer abrasive particles are ingested because most particles sink faster than the upward flow in the emergency pump inlet pipe and the less abrasive water extends the emergency pump life.

When it does require maintenance, the emergency pump system is designed so that the mean time to repair is short. Small modular elements that are easily and quickly replaced are utilized in the makeup of the system. Down-well parts are small and light and can be removed an reinserted manually. All electrical and rotating parts are above ground and kept dry and can be easily accessed. Diagnostics from the various monitors and sensors included in the system should pinpoint the most likely module to have caused the outage.

Figure 2:
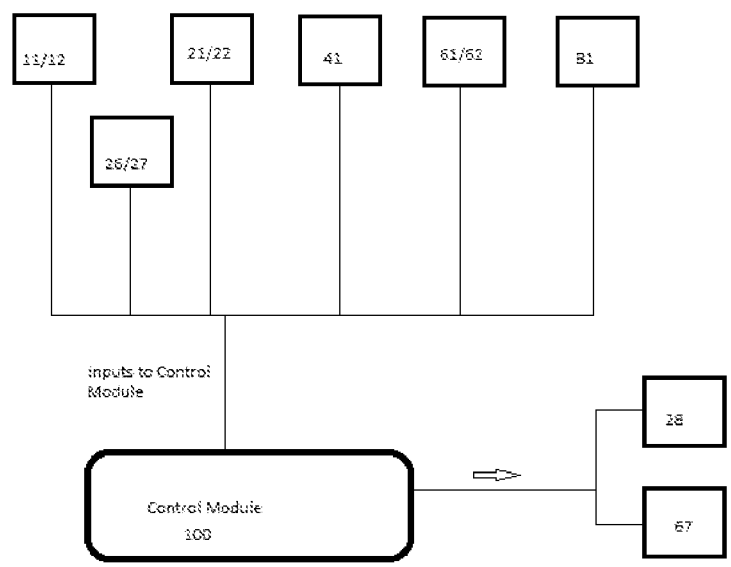
FIG. 2 is block diagram of the basic sensors and control module for the system which include solar panel voltage sensor (11), solar panel outlet current sensor (12), battery voltage sensor (27), battery current sensor (26), gear motor voltage sensor (21), gear motor current sensor (22), cam optical interrupter (41), hydraulic pump pressure insert stroke sensor (62), hydraulic pump pressure retract stroke sensor (61), water outlet pressure sensor (81), and microprocessor control and diagnostic module (100). The microprocessor control module (100) outputs a motor speed setpoint to the speed controller (28) and commands to the recenter solenoid valve (67).

Although FIGS. 1 and 2 and the above description represent the preferred embodiment of the invention, it should be recognized that the invention is not limited to the exact configuration and sizes described above.

Potential CPC patent classification for this invention:
Class F04: Positive—Displacement Machines for Liquids; Pumps for Liquids or Elastic Fluids
Sub-Class F04B: Positive Displacement Machines for Liquids; Pumps The present invention described above and illustrated in FIGS. 1 and 2 is visualized as the preferred embodiment of the invention. It is envisioned that this invention may be embodied in many different forms and should not be construed as limited to the embodiments set forth herein. It will be understood by those skilled in the art that changes in forms and details may be made without departing from the spirit and scope of the present application. It is therefore intended that the present invention is not limited to the exact forms and details described and illustrated herein but falls within the scope of the appended claims.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a stricture or feature that is disposed "adjacent" another feature may have portions that overlap or underlie the adjacent feature.

The invention claimed is:

1. An emergency water pump system for the provision of water from a well where the system comprises: a solar panel, solar power control and a battery charger, a battery, a speed controller, a gear motor, a cam, a stroke adjustor, a hydraulic pump, a makeup hydraulic water supply tank, a re-center valve, a hydraulic motor, a reciprocating motion pump, and a microprocessor control module comprising: a solar panel voltage sensor, a solar power outlet current sensor, a battery voltage sensor, a battery current sensor, a gear motor voltage sensor, a gear motor current sensor, a cam optical interrupter, a hydraulic pump pressure insert stroke sensor, a hydraulic pump retract stroke sensor, and a water outlet pressure sensor; and wherein said system provides 10-140 gallons of water per day.

2. The emergency water pump system of claim 1, further comprising a vessel for storing water produced by the system.

3. A method of providing 10-140 gallons of water per day from an existing water well water pump system, wherein the water pump system is independent of an electrical grid and uses solar energy as the power source, said water pump system comprising: a solar panel, solar power control and a battery charger, a battery, a speed controller, a gear motor, a cam, a stroke adjustor, a hydraulic pump, a makeup hydraulic water supply tank, a re-center valve, a hydraulic motor, a reciprocating motion pump, and a microprocessor control module with sensors for comprising: a solar panel voltage sensor, a solar power outlet current sensor, a battery voltage sensor, a battery current sensor, a gear motor voltage sensor, a gear motor current sensor, a cam optical interrupter, a hydraulic pump pressure insert stroke sensor, a hydraulic pump retract stroke sensor, and a water outlet pressure sensor, and said method comprising the steps of:

said solar panel providing power for said water pump system, said battery storing energy from said solar power for nighttime use, and said gear motor, said cam, said stroke adjustor, said reciprocating motion pump and said hydraulic motor pump water from said water well and said microprocessor control module operating and monitoring the activities of the water pump system providing operational and diagnostic data.

4. The water pump system of claim 3, further comprising a vessel for storing water produced by the system.

* * * * *